Figure 1:
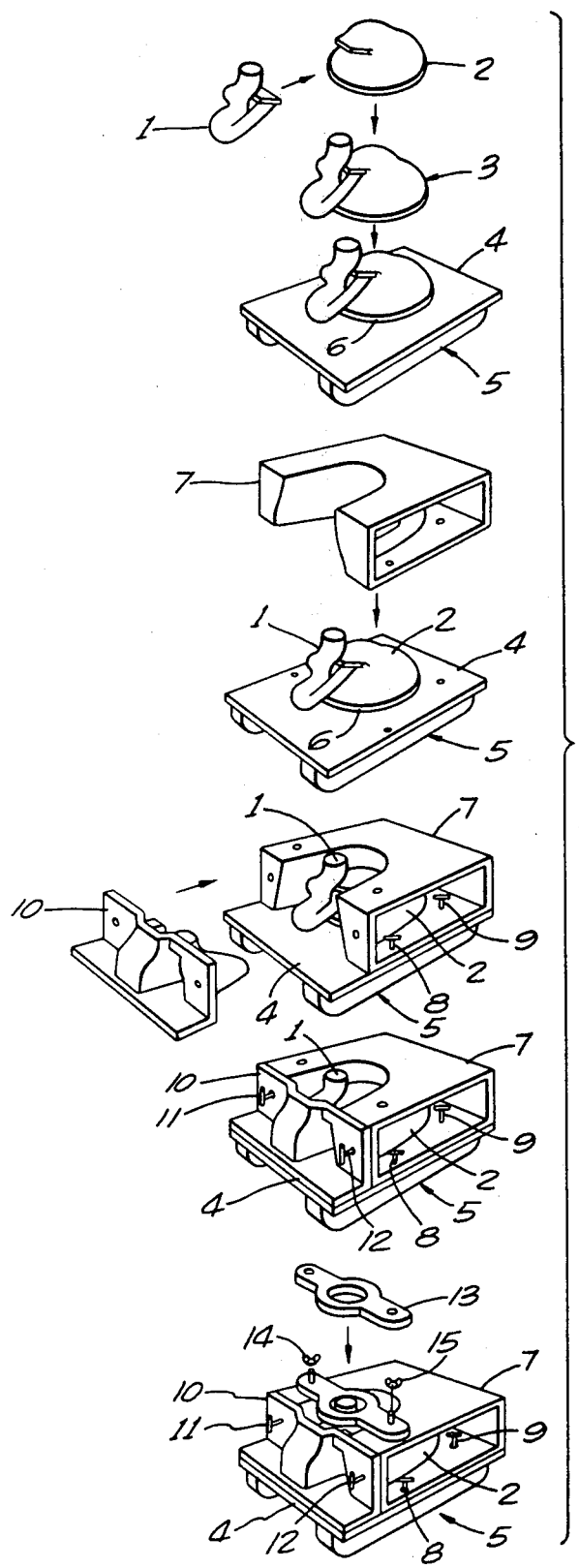

United States Patent [19]

Garasi et al.

[11] 4,373,219
[45] Feb. 15, 1983

[54] CAST TOILET BASE STRUCTURE

[75] Inventors: Louis A. Garasi, Canyon Country; Ronald F. Hayes, Northridge, both of Calif.

[73] Assignee: Gruber Systems, Inc., Valencia, Calif.

[21] Appl. No.: 259,417

[22] Filed: May 1, 1981

Related U.S. Application Data

[62] Division of Ser. No. 138,209, Apr. 7, 1980, Pat. No. 4,328,179.

[51] Int. Cl.³ .................. E03D 1/00; E03D 3/00; E03D 5/00
[52] U.S. Cl. .................................... 4/300; 4/420
[58] Field of Search ............... 4/300, 310, 311, 348, 4/420

[56] References Cited

U.S. PATENT DOCUMENTS 3,591,868 7/1971 Owens .................................... 4/300
4,145,772 3/1979 Whitney et al. ...................... 4/300
4,162,548 7/1979 Groombridge ........................ 4/300
4,176,413 12/1979 Whitney et al. ..................... 4/300

Primary Examiner—Henry K. Artis
Attorney, Agent, or Firm—Kendrick, Netter & Bennett

[57] ABSTRACT

A toilet base containing substantially no ceramic material includes a one-piece plastic bowl with a smooth interior surface and a plastic trap that are mounted within a cast thermoset plastic containing a major amount by weight of one or more fillers such as calcium carbonate, alumina, glass frit and mixtures thereof.

9 Claims, 1 Drawing Figure

CAST TOILET BASE STRUCTURE

This is a division, of application Ser. No. 138,209, filed Apr. 7, 1980, now U.S. Pat. No. 4,328,179.

This invention relates to a toilet base or toilet bowl structure that contains substantially no ceramic material. In particular, this new structure includes a plastic bowl and a plastic trap having smooth interior surfaces. The bowl and trap are mounted in a cast, thermoset plastic that forms the exterior of the toilet base.

Almost all toilet bowl and toilet base structures are made of molded ceramic materials. Unfortunately, inherent difficulties in the molding of such materials prevent adherence to dimensional specifications and tolerances to any degree greater than plus or minus 10%. Moreover, conventional ceramic molding processes used to make toilet bases are expensive. The molds for such ceramics depreciate quickly, and the molding process itself consumes many hours. Further, because the interior surfaces, and particularly the trapways, of ceramic toilet base structures are rough and unglazed, large quantities of water are required to flush such toilets. Moreover, ceramics are porous and tend to accumulate residues on their surfaces. That, too, restricts water flow and increases the quantity of water needed to flush the toilets effectively.

Proposals to solve these problems include making the toilet base entirely from molded plastic material. See, for example, U.S. Pat. No. 3,212,106. None of these proposals has ever proven commercially practicable, apparently because the molding processes for such toilet bases would be at least as difficult to control as those for making ceramic toilet bases, and because all-plastic toilets are commercially unacceptable.

This invention provides a toilet base structure that contains substantially no ceramic material, and can therefore be made to exacting dimensional tolerances. The new toilet base structure includes a plastic bowl and a plastic trap having smooth interior surfaces. Both bowl and trap can be readily made to exacting dimensional tolerances. Because their interiors are smooth surfaced, they require substantially less water for flushing than ceramic toilets. These toilets also include a cast exterior surface made of filled or reinforced plastics. Such exteriors have the aesthetic and commercial appeal of ceramic toilets, yet can be made to exacting dimensional tolerances in a wide variety of colors and shapes using standard casting techniques.

The new toilet base structure includes a plastic toilet bowl having a smooth interior surface. This bowl is preferably of one-piece construction. The trap of the new toilet base structure is also made of a plastic having a smooth interior surface and is also preferably one piece, but can be two or more pieces. These bowls and traps can be made of thermoplastic or thermosetting material such as epoxies, phenolics, polyethylenes, polypropylenes, polyesters, acrylics, fiberglass-reinforced plastics such as fiberglass-reinforced polyester, rigid polyvinylchloride, acetal, nylon, polycarbonate, chlorinated polyethers, polyacrylonitrilebutadiene-styrene, other polystyrenes, especially high impact polystyrenes, and others. Depending on the strength requirements and the method of forming these plastics, they may also be provided with fillers or reinforcing fibers, as desired, such as glass, asbestos, synthetics, cellulosics, sisal, and other suitable fibers. They can be formed into the desired shape by such methods as injection molding, blow molding and thermoforming.

Polyester resins are saturated or unsaturated polycondensation products of dicarboxylic acids or anhydrides with dihydric alcohols. Polyester resins may be made by reacting dihydric alcohol and a dibasic acid or anhydride, either or both of which may contain a double-bonded pair of carbon atoms. The alcohol and the acid are heated to sufficiently high temperatures to react, split out water and form ester linkages. The double bonds in the unsaturated polyester resin provide sites for cross-linking. Cross-linking is effected by reacting the unsaturated polyester resin with a polymerizable monomer such as styrene under the influence of a suitable catalyst system as a peroxide. In this reaction, the double bonds of the unsaturated polyester resin connect with those of the monomer. This process, called copolymerization or cross-linking, forms a thermoset which, when fully cured, is insoluble and infusible.

Unsaturated polyesters can be combined with reinforcing materials such as glass, synthetics, cellulosics, sisal and other fibers by using such methods as spray-up, hand lay-up, preform or mat molding, premix, vacuum or pressure bag molding, matched metal molding and other such methods. The polyester resins can also be made into putty-like premixes that can be molded in conventional transfer and compression presses.

To form the toilet base structure, the plastic bowl and plastic trap are placed in a mold, and a thermosetting resin, such as thermosetting polyester resins (with or without cross-linking monomers such as styrene) and thermosetting alkyl acrylates (e.g., methyl methacrylate), preferably reinforced with a major amount by weight of such fillers as calcium carbonate, alumina or glass frit (and one or more other fillers and pigments), is cast around the bowl and trap in the form of a toilet base. The casting is then cured to form a substantially rigid, infusible, insoluble structure. The casting process permits formation of a toilet base structure in any desired, commercially attractive shape and size and in a wide variety of colors. Cast, thermoset resins containing major amounts by weight of fillers provide an aesthetic appeal that is well-accepted commercially. Moreover, the casting process avoids use of ceramic materials, and permits making toilet base structures to exacting dimensional tolerances.

Because the plastic bowl and trap are surrounded by the cast, thermoset plastic material that forms the exterior of the toilet base, they cannot be dislodged from the finished product without destroying it. Fixed in the thermoset toilet base exterior, the bowl and trap form a unitary structure that is strong and durable, in a structure that is commercially attractive. Because the interior surfaces of the bowl and trap are smooth-surfaced plastic, substantially less water is required to flush toilets that include the new toilet base. Further, the cost of making the toilet base is substantially lower than the cost of making conventional ceramic toilet bases. Because the bowl and trap can be made to exacting dimensional tolerances, the cast exterior of the toilet can be made to exacting tolerances as well. That permits minimizing the exterior wall thicknesses, reducing the weight of the product and its cost. Moreover, the exterior walls can incorporate a wide range of decorative features that are commercially desirable in ceramic toilet bases. Because the new toilet base is substantially all cast, thermoset-filled plastic material, it is much stronger and more durable than the all-plastic toilet proposed in U.S. Pat. No. 3,212,106, and much stronger and more impact resistant than ceramic toilets as well.

The new toilet base, and the method of making the new toilet base, are better understood by reference to the drawing that accompanies and forms part of this disclosure.

Referring now to that drawing, the fiberglass-reinforced plastic trap 1 is joined to fiberglass-reinforced plastic molded bowl 2 (as generally shown at 3), and placed on platform 4 of mold 5. To prevent leakage of thermosetting plastic material into the bowl cavity during the casting procedure, the bowl is temporarily sealed to platform 4 with sealant 6.

Toilet bowl mold structure 7 is then placed on platform 4 and secured thereto with four T-handle bolts. Two of those bolts 8 and 9 are shown in the sequence of drawings.

After mold structure 7 is secured to platform 4, lightener mold 10 is placed in position on platform 4 and secured thereto with two T-handle bolts 11 and 12. Thereafter, the casting mixture including thermosetting polyester resin and a major amount by weight of filler such as calcium carbonate, glass frit, alumina or a mixture thereof and one or more other dyes and pigments is poured into the mold to form the structure of the toilet base exterior.

Finally, ring mold 13 is placed on top of mold structure 7 and secured in place with nut and bolt means 14 and 15. Ring mold 13 provides a form for the conventional bottom structure of the toilet base. Thereafter, additional polyester casting mixture is poured into the mold while the mold is vibrated, and the structure is allowed to cure. Upon completion of that operation, the mold forms 7, 10 and 13 are removed, and the finished toilet base is separated from platform 5, ready for use.

What is claimed is:

1. A toilet base including an organic plastic bowl and an organic plastic trap that are fixed within and surrounded by thermoset organic plastic that forms the exterior of said toilet base whereby said toilet base is substantially all cast, thermoset organic plastic that forms the structure of said toilet base without need of a separate outer plastic shell.

2. The toilet base of claim 1 wherein said organic plastic bowl has a smooth interior surface.

3. The toilet base of claim 1 or claim 2 wherein the thermoset organic plastic is a thermoset polyester.

4. The toilet base of claim 1 or claim 2 wherein the thermoset organic plastic is a thermoset polyester that includes a major amount by weight of at least one filler.

5. A toilet base according to claim 1 or claim 2 wherein the thermoset organic plastic is a thermoset polyester that includes a major amount by weight of at least one filler selected from the group consisting of calcium carbonate, glass frit, alumina, and mixtures thereof.

6. The toilet base of claim 1 or claim 2 wherein the organic plastic bowl is made of fiberglass-reinforced organic plastic.

7. The toilet base of claim 1 or claim 2 wherein the organic plastic bowl is a fiberglass-reinforced polyester.

8. The toilet base of claim 1 or claim 2 wherein the thermoset organic plastic is a thermoset methyl methacrylate.

9. The toilet base of claim 1 or claim 2 wherein the organic plastic bowl is made of thermoplastic acrylic.

* * * * *